United States Patent Office 3,085,196
Patented Apr. 9, 1963

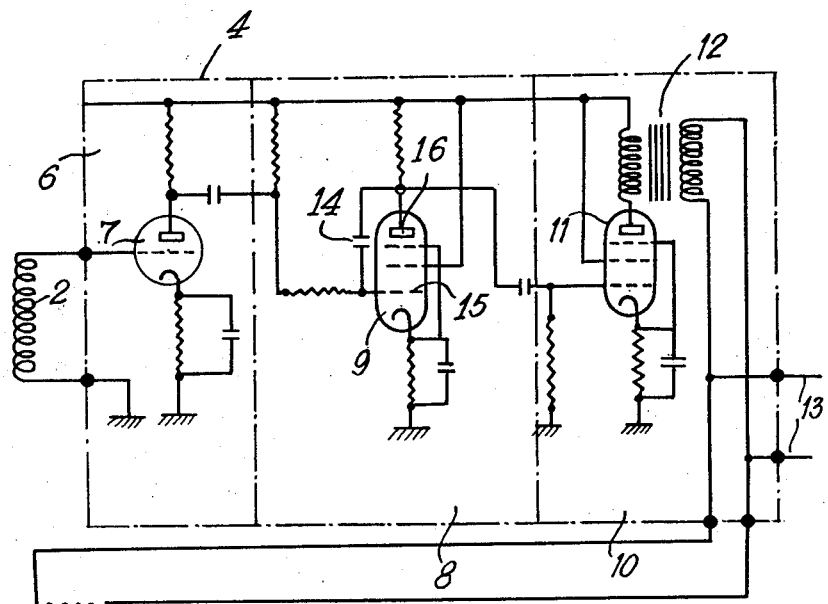
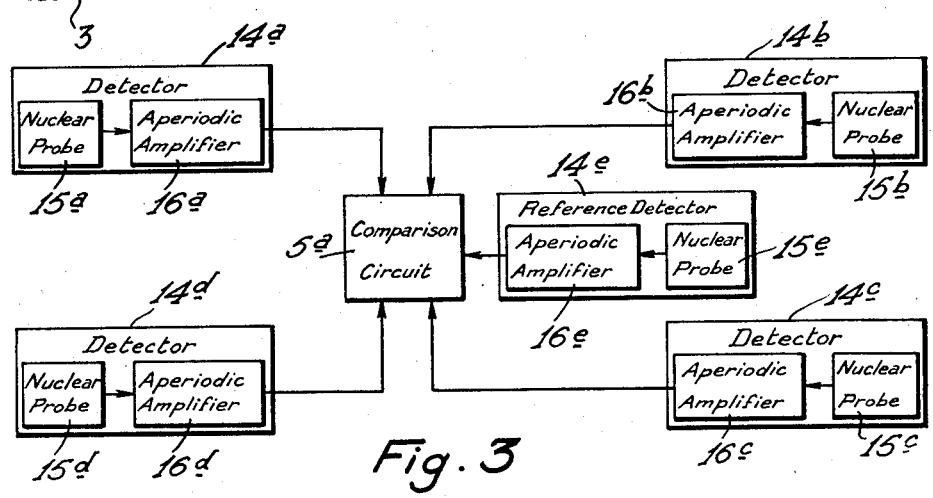
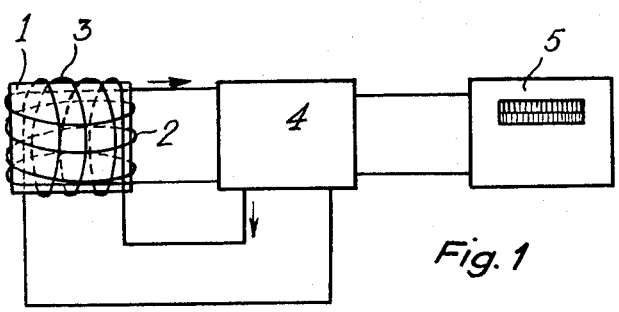

3,085,196
SELF-OSCILLATORS WITH NUCLEAR SPINS SUBJECTED TO MAGNETIC RESONANCE
Georges Jacques Raymond Martin, Colombes, France, assignor to Sud-Aviation Societe Nationale de Constructions Aeronautiques, Paris, France
Filed Dec. 16, 1959, Ser. No. 860,000
Claims priority, application France Dec. 22, 1958
7 Claims. (Cl. 324—.5)

The mode of exploitation of the signals produced in the measurement of magnetic fields by nuclear resonance methods, and which consists in detecting a small variation in the energy stored in a circuit of high overvoltage, presents a number of practical difficulties.

With methods which make use of a self-oscillator, these signals are furnished through the interaction which takes place between a spin sample subjected to the resonance and a passive oscillating circuit sustaining this resonance. However, such a self-oscillator possesses an inherent practical drawback with respect to measurement accuracy, for theory shows that the difference between the frequency of the signals produced by the self-oscillator and the theoretical frequency of nuclear resonance or Larmor's precession frequency is proportional to the difference existing between the tuned frequency of the oscillating circuit and the theoretical frequency itself.

The proportionality coefficient between said two frequencies is a function, on the one hand, of data appertaining to the spin sample subjected to the resonance and, on the other hand, of the overvoltage in the oscillating circuit. Now in order to sustain the oscillations, this overvoltage must not drop below a certain value and this in turn means that the proportionality coefficient possesses a minimum value which is such that obtainment of the theoretical accuracy in conjunction with the use of resonance phenomena is possible only subject to precise measuring or adjusting of the characteristics of the oscillating circuit and assurance of perfect stability in the elements constituting this circuit.

An analysis of the pulling or frequency variation in a self-oscillator of this type shows that the phenomenon is due to the fact that in a passive oscillating circuit a well-defined relation exists between the overvoltage and the phase characteristic.

The relative error in the frequency, and hence the relative error in the field to be measured, is given by the relation:

$$\frac{\Delta f}{f} = \frac{1}{K} \frac{\Delta f_c}{f}$$

where $\Delta f$ is the difference between the frequency of the signals delivered by the self-oscillator and the frequency of nuclear resonance of Larmor's precession frequency, $\Delta f_c$ is the difference between the tuned frequency of the oscillating circuit and the Larmor's precession frequency, and K is a numerical coefficient which is of the order of 85 to 50 in practical cases.

Should it be desired to obtain $$\frac{\Delta f}{f} = 10^{-5}$$

it is necessary to have $$\frac{\Delta f_c}{f} = K.10^{-5}$$

this is the accuracy to within which must be measured the tune of the oscillating circuit as well as the stability required of it.

With a view to suppress such a constraint, the present invention has for its object a self-oscillator making use of nuclear spins subjected to a magnetic resonance, char- acterized by the fact that its output signals possess a frequency which is rigorously proportional to the field to be measured, without it being necessary to correct the measured frequency by determination of the elements in the oscillating circuit, or to accurately adjust this circuit and ensure the constancy of such an adjustment.

In a preferred embodiment, the self-oscillator having nuclear spins and subjected to a magnetic resonance comprises, in the oscillation loop, an active amplifier delivering signals the amplitude and phase of which are maintained constant. This active amplifier is preferably constituted by an aperiodic amplifier, i.e., an active amplifier without reactive component.

An advantage of this device resides in the fact that its use theoretically allows eliminating any pulling or at any rate rendering such a pulling virtually negligible, for measurements the relative accuracy of which is of one-millionth. This advantage results chiefly from the property imparted to the phase characteristic of the delivered signals.

In addition to the advantage offered by suppression of this perturbing effect, the complication resulting from introduction of an amplifier into the oscillation loop, as compared to self-oscillators of the conventional passive oscillating circuit type, is an apparent one only, for an oscillator of the passive oscillating circuit type produces signals at low level and requires the presence of an amplifier to raise this level to a value which will permit convenient utilization.

The invention further has for its object industrial applications of the self-oscillator specified hereinbefore, especially in nuclear-resonance type magnetometers, either for absolute measurements of magnetic fields using a counting-type frequency-meter, or for determining the difference between the values of a magnetic field at several predetermined positions by using a device of the type described in the French Patent No. 1,212,406, filed on October 15, 1958, by the company to which the present U.S. patent application is assigned.

The following description given with reference to the accompanying drawings provided by way of example only and not in a limiting sense, will make it clear how the invention may be put into practice.

In the drawings:

FIG. 1 is a diagrammatic view of a nuclear-resonance type magnetometer according to the invention.

FIG. 2 is the detailed wiring diagram of the amplifier introduced into the oscillation loop of the self-oscillator of the magnetometer shown in FIG. 1.

FIGURE 3 diagrammatically illustrates a magnetometer for determining the differences between the values of a magnetic field in several positions.

In the embodiment shown in FIG. 1, the nuclear-resonance type magnetometer comprises a vessel 1 containing the sample of nuclear spins used for the measurements, these spins being constituted for instance by the protons of water. A coil 2, which is a pick-up coil, surrounds the vessel 1, and magnetization of the nuclear spins subjected to the resonance induces an alternating current in this coil. A second coil 3, which is an excitation coil, also surrounds the vessel 1 and is fed by an alternating current at resonance frequency. An amplifier 4, having a monitored phase characteristic, has its input connected to the coil 2 and its output to the coil 3. The amplifier 4 also has its output connected to a device 5 which uses or measures the signals furnished by the self-oscillator.

The coils 2 and 3 are arranged so that they offer a zero coupling coefficient between them over the zone of useful frequencies, so that it shall not be possible for the overall system to be set in oscillation in the absence of the sample subjected to the magnetic resonance. Such an uncoupling can be achieved either by a suitable geometrical layout for the coils, or, should this latter method prove inadequate, by an outside compensating electrical device.

This requirement is obtainable by means of a suitable geometrical layout wherein the axes of the two coils lie in the same plane, at right angles to each other, as shown in FIG. 1.

When such a layout is adopted for the pick-up and excitation coils, calculation shows that, in order to avoid any pulling the phase-shift introduced by the amplifier between the current fed into the coil 3 and the input voltage supplied by the coil 2, must be equal to 90 degrees.

The electrical wiring diagram for the amplifier is as follows (see FIG. 2):

The signal emerging from the coil 2 is applied to an amplifier stage 6 equipped with an electron tube 7. After being amplified in this stage 6, the signals are applied to a phase-shifting circuit 8 constituted by an integrator of the Miller integrator type, equipped with a pentode 9 and producing the desired 90 degrees phase shift when the capacity of the capacitor 14 interconnecting the control grid 15 and the anode 16 of said pentode has a suitable value.

The signals emerging from this phase-shifting circuit 8 control a further amplifier stage 10 equipped with an electron tube 11 on the plate of which is connected the coil 3 through the medium of the transformer 12.

Aperiodicity of the overall system is ensured by virtue of the fact that the effect of increasing amplitude with increasing frequency, due to the induction phenomenon in the coil 2, is exactly compensated by the properties of the integrator 8. In fact, in order to obtain an accurate operation of the overall system, it is necessary that said system is not saturated, therefore the properties of the phase-shifting circuit must be used for stabilizing the signal amplitude relative to its initial value. The signals transmitted to coil 3 have the same frequency as those received by coil 2 which are amplified, phase-shifted by 90° and transmitted to coil 3.

The amplifier stage 10 is also provided with an output 13 to allow utilization of the signals in the apparatus 5.

Should it be desired to make absolute measurements of magnetic fields, the device 5 consists of a counting-type frequency-meter which gives an indication proportional to the field H to be measured, in accordance with the formula:

$$f = \frac{\gamma}{2\pi} H$$

where $\gamma$ is the gyromagnetic ratio of the sample of spins subjected to the resonance and $f$ the resonance frequency.

Where it is desired to make relative measurements, in which it is proposed for instance to determine the differences between the values of a magnetic field at different points in relation to any perturbation of said field in at least one of said points, the device 5 consists of a comparison circuit 5a with differential action which is connected to the outputs of detectors 14a to 14e located at said points and constituted by self-oscillators of the type hereinbefore described comprising unclear probes 15a to 15e and aperiodic amplifiers 16a to 16e (FIG. 3).

The detectors 14a to 14d, measure detectors, are submitted to the magnetic field H to be measured, to the erratic fluctuations thereof and to perturbations of said field generated by any extraneous action. The detector 14e, reference detector, is so disposed that it is protected against any extraneous perturbations of the field and it is only submitted to said field and to the erratic fluctuations thereof. The signals issuing from one of the measure detectors and from said reference detector are opposed in the comparison circuit 5a, which, by differential effect, eliminates the fluctuations of the field and brings to view the perturbation of said field at the point where said measure detector is located. Such measures effected for the various measure detectors 14a to 14d allow to determine the differences between the values of the magnetic field at the points where said measure detectors are located, as indicated in said French Patent No. 1,211,406.

Obviously, modifications suggested by considerations of a constructional or practical order may be made to the embodiment shown in the drawings, without departing from the scope of the present invention as defined in the appended claims.

What I claim is:

1. In a self-oscillator with nuclear spins subjected to magnetic resonance and usable for determining the absolute value of a magnetic field and the difference between the values of such a field in at least two given positions, of the type having an excitation coil wound around a vessel containing the nuclear spin sample and fed by an alternating current at resonance frequency, a pick-up coil wound around said vessel with its axis disposed in the same plane of, and perpendicular to, the axis of said excitation coil, and an amplifier the output and input of which are respectively connected to the excitation coil and to the pick-up coil; the improvement according to which the amplifier is aperiodic, i.e. active without reactive component, and comprises an input amplifying stage, and an output amplifying stage, both equipped with an electron tube, means inserted between said two stages for introducing a phase-shift equal to 90° between the current fed into the excitation coil and the input voltage supplied by the pick-up coil, and a transformer the primary winding of which is connected to said excitation coil while its secondary winding is connected to the plate of the electron tube equipping the output amplifying stage, whereby the amplitude and phase of the signals delivered by said amplifier are kept constant, said signals having a frequency strictly proportional to the absolute value of the magnetic field to be measured.

2. Self-oscillator according to claim 1, wherein the means for introducing a phase-shift equal to 90 degrees is constituted by a phase-shifting circuit adapted to compensate any increase in amplitude generated by an increase in frequency, due to the induction effect in the pick up coil.

3. Self-oscillator according to claim 2, wherein the phase-shifting circuit consists in an integrator equipped with electron tube and of the type of the Miller's integrator comprising a pentode having a control guide and an anode, and a capacitor interconnecting said control grid and said anode and the capacity of which is determined so that the Miller's integrator generates a phase-shift equal to 90° between its input voltage and output current.

4. Self-oscillator according to claim 1, further comprising a counting-type frequency-meter connected to the output of the amplifier, whereby the thus obtained assembly acts as a nuclear-resonance type magnetometer for absolute measurements of magnetic fields.

5. Self-oscillator according to claim 1, further comprising a comparison circuit with differential action connected to the output of the amplifier, at least one self-oscillator similar to the first one and the amplifier of which is connected to said comparison circuit, one of the self-oscillators being subjected to the action of a magnetic field and of the erratic fluctuations thereof while each other self-oscillator is subjected to the action of said magnetic field and of the erratic fluctuations and perturbations thereof, whereby the thus obtained assembly acts as a nuclear-resonance type magnetometer to determine the differences between the values of the magnetic field in at least two given positions in relation to any perturbation of said field in at least one of said positions.

6. In a nuclear-resonance type magnetometer for absolute measurements of magnetic fields of the type comprising a self-oscillator with nuclear spins subjected to magnetic resonance consisting of a vessel containing a sample of nuclear spins, an excitation coil wound around said vessel and fed by an alternating current at resonance frequency, a pick-up coil wound around said vessel in order to offer a zero coupling coefficient with said excitation coil over the zone of useful frequencies, and an amplifier fed by the pick-up coil, feeding the excitation coil and the output of which is connected to a counting-type frequency-meter; the improvement according to which the amplifier is aperiodic, i.e. active without reactive component, and comprises an input amplifying stage and an output amplifying stage, both equipped with an electron tube, means inserted between said two stages for introducing a phase-shift equal to 90° between the current fed into the excitation coil and the input voltage supplied by the pick-up coil, and a transformer the primary winding of which is connected to said excitation coil while its secondary winding is connected to the plate of the electron tube equipping the output amplifying stage, whereby the amplitude and phase of the signals delivered by said amplifier are kept constant, said signals having a frequency strictly proportional to the absolute value of the magnetic field to be measured.

7. In a nuclear-resonance type magnetometer for the determination of the difference between the values of a magnetic field in at least two given positions in relation to any perturbation of said field in at least one of said positions, of the type comprising at least two self-oscillators with nuclear spins subjected to magnetic resonance and connected to a comparison circuit with differential action, each self-oscillator consisting of a vessel containing a sample of nuclear spins, an excitation coil wound around said vessel and fed by an alternating current at resonance frequency, a pick-up coil wound around said vessel in order to offer a zero coupling coefficient with said excitation coil over the zone of useful frequencies, and an amplifier fed by the pick-up coil and feeding the excitation coil, one of the self-oscillators being subjected to the action of a magnetic field and of the erratic fluctuations thereof while each other self-oscillator is subjected to the action of said magnetic field and of the erratic fluctuations and perturbations thereof; the improvement according to which, for each self-oscillator, the amplifier is aperiodic, i.e. active without reactive component, and comprises an input amplifying stage and an output amplifying stage, both equipped with an electron tube, means inserted between said two stages for introducing a phase-shift equal to 90° between the current fed into the excitation coil and the input voltage supplied by the pick-up coil, and a transformer the primary winding of which is connected to said excitation coil while its secondary winding is connected to the plate of the electron tube equipping the output amplifying stage, whereby the amplitude and phase of the signals delivered by said amplifier are kept constant, said signals having a frequency strictly proportional to the absolute value of the magnetic field to be measured at the corresponding measurement position.

References Cited in the file of this patent

UNITED STATES PATENTS

| | | |
|---|---|---|
| 2,589,494 | Hershberger | Mar. 12, 1952 |
| 2,772,391 | Mackey | Nov. 27, 1956 |
| 2,793,360 | Beaumont | May 21, 1957 |
| 2,908,858 | Nelson | Oct. 13, 1959 |
| 2,916,690 | Leete | Dec. 8, 1959 |

FOREIGN PATENTS

| | | |
|---|---|---|
| 592,241 | Great Britain | Sept. 11, 1947 |
| 1,127,155 | France | Aug. 6, 1956 |